United States Patent
Ohashi

(10) Patent No.: US 11,114,681 B2
(45) Date of Patent: Sep. 7, 2021

(54) FUEL CELL SYSTEM AND METHOD OF CONTROLLING THE SAME

(71) Applicant: Toyota Jidosha Kabushiki Kaisha, Toyota (JP)

(72) Inventor: Yasuhiko Ohashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 211 days.

(21) Appl. No.: 16/352,457

(22) Filed: Mar. 13, 2019

(65) Prior Publication Data

US 2019/0288305 A1 Sep. 19, 2019

(30) Foreign Application Priority Data

Mar. 16, 2018 (JP) .............................. JP2018-048666

(51) Int. Cl.
*H01M 8/04089* (2016.01)

(52) U.S. Cl.
CPC .... *H01M 8/04089* (2013.01); *H01M 2250/20* (2013.01)

(58) Field of Classification Search
None
See application file for complete search history.

(56) References Cited

U.S. PATENT DOCUMENTS

| 2010/0065359 A1 | 3/2010 | Jufuku et al. |
| 2012/0070757 A1 | 3/2012 | Katano |
| 2017/0250420 A1 | 8/2017 | Nakagawa et al. |

FOREIGN PATENT DOCUMENTS

| JP | 2008-279955 A | 11/2008 |
| JP | 2010-061960 A | 3/2010 |
| JP | 2010-269760 A | 12/2010 |
| JP | 2011-258567 A | 12/2011 |
| JP | 2013-258111 A | 12/2013 |
| JP | 2017-157297 A | 9/2017 |

*Primary Examiner* — Kenneth J Douyette
*Assistant Examiner* — Heng M. Chan
(74) *Attorney, Agent, or Firm* — Dinsmore & Shohl LLP

(57) ABSTRACT

The fuel cell system performs prevention control for preventing an anode gas detector from erroneously detecting anode gas discharged from an exhaust port as leakage of anode gas from an anode gas flow path, when at least one of (i) a flow rate proportion, found by dividing a measured flow rate of cathode gas by an assumed flow rate of the cathode gas, is smaller than a predetermined flow rate proportion threshold, (ii) a pressure proportion, found by dividing a measured gas pressure by an assumed gas pressure, is larger than a predetermined pressure proportion threshold, and (iii) a voltage proportion, found by dividing a measured voltage of the fuel cell by an assumed voltage of the fuel cell, is smaller than a predetermined voltage proportion threshold, is satisfied. This prevents the anode gas detector from erroneous detection as leakage of anode gas.

6 Claims, 13 Drawing Sheets

FUEL CELL SYSTEM AND METHOD OF CONTROLLING THE SAME

CROSS-REFERENCE TO RELATED APPLICATION

The present application claims priority from Japanese patent application 2018-048666 filed on Mar. 16, 2018, the content of which is hereby incorporated by reference into this application.

BACKGROUND

1. Field

The present disclosure relates to a fuel cell system and a method of controlling the fuel system.

2. Related Art

As described in Japanese Patent Application Laid-open No. 2008-279955, there is proposed a fuel cell vehicle provided with an anode gas detector that detects leakage of anode gas used for a fuel cell. Moreover, in the fuel cell vehicle described in Japanese Patent Application Laid-open No. 2010-61960, anode exhaust gas containing liquid is discharged to an exhaust pipe from a gas-liquid separator provided in the anode gas circulation system, diluted with cathode gas, and then discharged to the outside of the vehicle after being.

Here, when the fuel cell vehicle travels on a flooded road, if a water surface has reached an exhaust port for discharging gas including anode gas, the gas discharged from the exhaust port may not be normally diffused to the outside of the vehicle. The inventors of the present application found that in such a case, gas including anode gas enters the inside of the vehicle through gaps of the vehicle and reaches an anode gas detector provided in the vehicle, which may cause the anode gas detector to erroneously detect it as leakage of anode gas from an anode gas flow path. Moreover, this is a problem not only in the fuel cell vehicle but in common to the fuel cell system.

SUMMARY

The present disclosure is made to solve the above-described problems, and may be achieved by the following forms.

(1) One form of the present disclosure provides a fuel cell system. The fuel cell system includes a fuel cell that generates power by electrochemical reaction between anode gas and cathode gas, an exhaust pipe that has an exhaust port for discharging exhaust gas including the cathode gas and the anode gas discharged from the fuel cell, a cathode gas supply flow path that supplies the cathode gas to the fuel cell, a compressor that is provided in the cathode gas supply flow path to feed the cathode gas to the fuel cell, an anode gas detector that is provided outside a flow path of the anode gas to detect the anode gas, and a control unit that performs, with a condition satisfied, prevention control for preventing the anode gas detector from detecting the anode gas as leakage of the anode gas. Here, the prevention control unit determines the condition when at least one of:

(i) a flow rate proportion found by dividing a measured flow rate that is a flow rate of cathode gas introduced by the compressor by an assumed flow rate of the cathode gas estimated on a basis of an outside air pressure and a rotation speed of the compressor, is smaller than a predetermined flow rate proportion threshold, (ii) a pressure proportion found by dividing a measured gas pressure that is a pressure at a cathode gas inlet or a cathode gas outlet of the fuel cell by an assumed gas pressure estimated on the basis of the outside air pressure and the rotation speed of the compressor, is larger than a predetermined pressure proportion threshold, and (iii) a voltage proportion found by dividing a measured voltage that is an outlet voltage of the fuel cell by an assumed voltage of the fuel cell estimated on the basis of a measured current that is an output current of the fuel cell and the rotation speed of the compressor, is smaller than a predetermined voltage proportion threshold, is satisfied.

In the fuel cell system of this form, the prevention control is performed in a situation supposing that a water surface has reached the exhaust port, which prevents erroneous detection of anode gas discharged from the exhaust port as leakage of anode gas from the anode gas flow path.

The present disclosure may be achieved by various forms, and may be achieved by the form of a method of controlling a fuel cell system, for example.

DETAILED DESCRIPTION

A. First Embodiment

Figure 1:
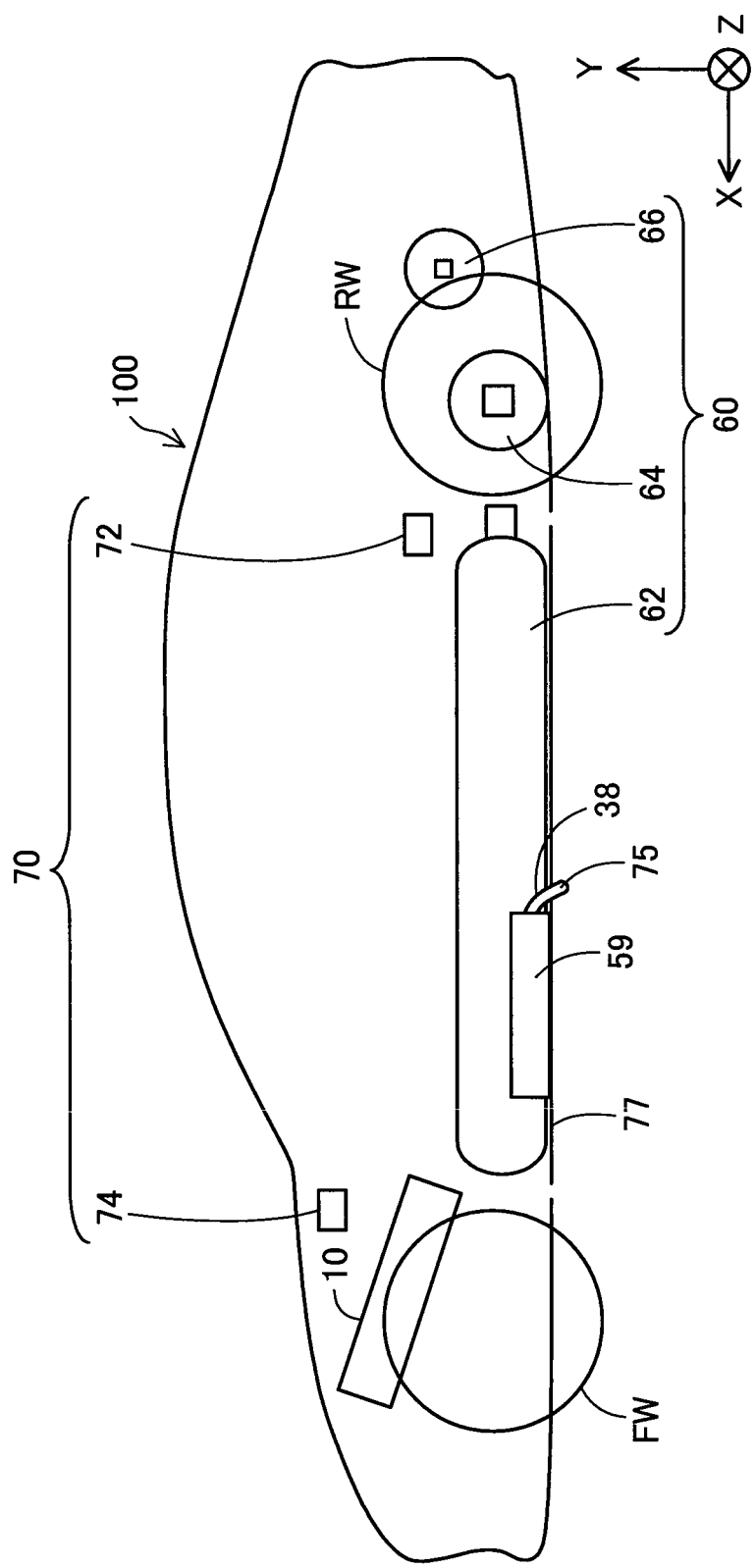
FIG. 1 is a schematic view of a vehicle with a fuel cell system according to an embodiment of the present disclosure.

FIG. 1 is a schematic view of a vehicle 100 with a fuel cell system according to an embodiment of the present disclosure. The description related to directions in the vehicle 100 ("right", "left", "front", "rear", "upper", "lower") indicates directions from a driver seated in the vehicle 100. In FIG. 1, an X-axis positive direction directs the vehicle front side, a Y-axis positive direction directs the gravity upper side, and a Z-axis positive direction directs the vehicle right side. That is, the X-axis direction represents a vehicle front-rear direction, the Y-axis direction represents a gravity direction, and the Z-axis direction represents a vehicle width direction. The XYZ axes are also applied to the diagrams following FIG. 1. Note that although the fuel cell system is provided in a vehicle in the embodiment, it may be provided in other moving bodies such as a ship, or a house, for example. Note that as anode gas, alcohol or hydrocarbon, for example, may be used instead of hydrogen gas.

The vehicle 100 includes a fuel cell stack (hereinafter, simply referred to as a "fuel cell") 10, an exhaust pipe 38 having an exhaust port 75, an anode gas tank 60, and an anode gas detector 70. The fuel cell 10 is configured by laminated power generation modules including a membrane electrode assembly (MEA) in which both electrodes of an anode and a cathode are joined to both sides of an electrolyte membrane. The fuel cell 10 generates power by electrochemical reaction between hydrogen gas as anode gas supplied from the anode gas tank 60 and oxygen in the atmosphere as cathode gas. In the embodiment, the fuel cell 10 is arranged in the front side (+X axis direction side) of the vehicle 100. To be more specific, in the front-rear direction (X-axis direction) of the vehicle 100, the fuel cell 10 is arranged at a position partially overlapping a front wheel FW. Note that the number and arrangement of the fuel cell 10 may be set arbitrarily. For example, the fuel cell 10 may be provided under a floor of the vehicle 100.

In the embodiment, the anode gas tank 60 of the vehicle 100 includes a first anode gas tank 62, a second anode gas tank 64, and a third anode gas tank 66. In the embodiment, the first anode gas tank 62 is provided between the front wheel FW and a rear wheel RW in the front-rear direction (X-axis direction) of the vehicle 100, and is provided along the front-rear direction (X-axis direction) of the vehicle 100. The second anode gas tank 64 is provided at a position overlapping the rear wheel RW in the front-rear direction (X-axis direction) of the vehicle 100, and is provided along the width direction (Z-direction) of the vehicle 100. The third anode gas tank 66 is provided at a position where a part thereof overlaps the rear wheel RW and the remaining part thereof is on the rear side than the rear wheel RW, and is provided along the width direction (Z-direction) of the vehicle 100. In the embodiment, the second anode gas tank 64 is provided on the front side (+X-axis direction side) of the vehicle 100 than the third anode gas tank 66. Note that the number and arrangement of the anode gas tank 60 may be set arbitrarily.

The anode gas detector 70 is an apparatus that detects leakage of anode gas from an anode gas flow path. In the embodiment, when the anode gas detector 70 has determined leakage of anode gas, an electronic control unit (ECU) 82 described later forcedly stops a fuel cell system 110. Moreover, in the embodiment, the anode gas detector 70 is an apparatus capable of also measuring concentration of anode gas. The anode gas detector 70 includes a first anode gas detector 72 and a second anode gas detector 74. In the embodiment, a hydrogen detector is used as the anode gas detector 70.

Generally, hydrogen tends to accumulate on the upper side of closed space. Thus, in the embodiment, the first anode gas detector 72 is provided on the upper side of the anode gas tank 60 to detect leakage of anode gas from the anode gas tank 60. To be more specific, the first anode gas detector 72 is provided between the front wheel FW and the rear wheel RW in the front-rear direction (X-axis direction).

More concretely, the first anode gas detector 72 is provided on the rear side than the center of the vehicle 100 and front side than the rear wheel RW in the front-rear direction (X-axis direction).

In the embodiment, the second anode gas detector 74 is provided on the upper side of the fuel cell 10 to detect leakage of anode gas from the fuel cell 10. To be more specific, the second anode gas detector 74 is provided at a position overlapping the fuel cell 10 in the front-rear direction (X-axis direction). Note that the number and arrangement of the anode gas detectors 70 and the number and arrangement of the anode gas tank 60 may be set arbitrarily.

The exhaust pipe 38 is provided to discharge gas not used by the fuel cell 10 and water generated in the fuel cell 10 to the outside of the vehicle. The exhaust port 75 of the exhaust pipe 38 projects to the lower side of the vehicle 100 from a hole provided on an undercover 77 of the vehicle 100. In the embodiment, the exhaust port 75 is provided between the front wheel FW and the rear wheel RW in the front-rear direction (X-axis direction). Note that the arrangement of the exhaust pipe 38 and the exhaust port 75 may be set arbitrarily.

Figure 2:
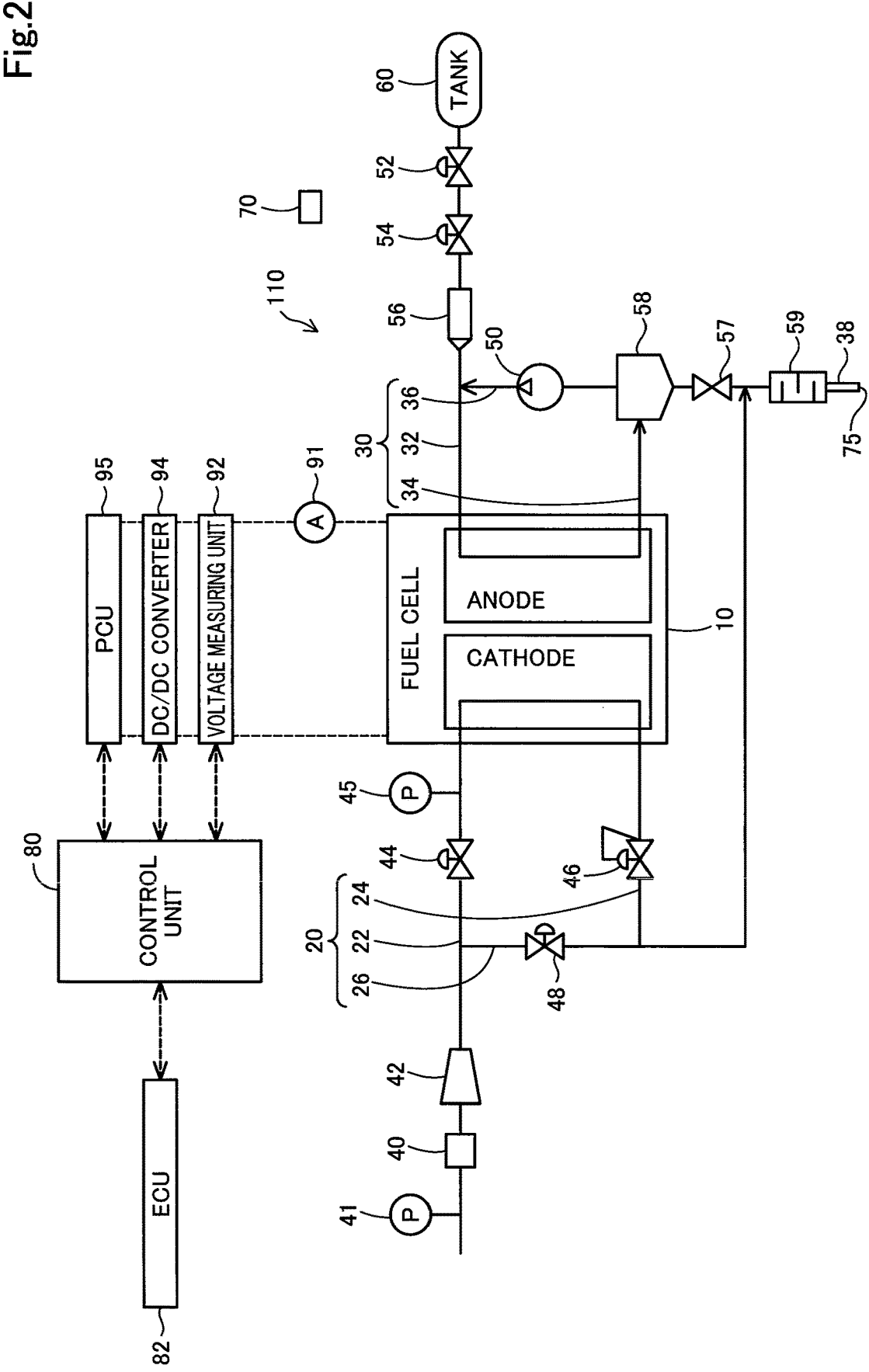
FIG. 2 is a schematic view illustrating a configuration of the fuel cell system provided in the vehicle.

FIG. 2 is a schematic view illustrating a configuration of the fuel cell system 110 provided in the vehicle 100. The fuel cell system 110 includes the fuel cell 10, a cathode gas flow path 20, an anode gas flow path 30, an exhaust pipe 38, and a control unit 80.

The cathode gas flow path 20 is a flow path for supplying and discharging cathode gas to and from the fuel cell 10. The cathode gas flow path 20 includes a cathode gas supply flow path 22 for supplying cathode gas to the fuel cell 10, a cathode gas exhaust flow path 24 for discharging cathode gas from the fuel cell 10, and a bypass flow path 26 connecting the cathode gas supply flow path 22 and the cathode gas exhaust flow path 24.

In the cathode gas supply flow path 22, there are provided, in the order from the upstream side, a barometer 41, a flowmeter 40, a compressor 42, a supply valve 44, and a pressure measuring unit 45. The barometer 41 is an apparatus that measures an outside air pressure. The flowmeter 40 is an apparatus that measures a flow rate of cathode gas introduced by the fuel cell system 110. The compressor 42 is an apparatus that compresses introduced cathode gas and feeds it to the fuel cell 10. The supply valve 44 is a valve that controls the presence and absence of inflow of cathode gas to the fuel cell 10 from the compressor 42, and is provided on the downstream side of the cathode gas supply flow path 22 than a connection portion with the bypass flow path 26. The pressure measuring unit 45 is an apparatus that measures a pressure at a cathode gas inlet of the fuel cell 10. In the embodiment, the pressure measuring unit 45 measures a pressure at a cathode gas inlet of the fuel cell 10. However, the embodiment is not limited thereto, and the pressure measuring unit 45 may be provided in the cathode gas exhaust flow path 24 to measure a pressure at a cathode gas outlet of the fuel cell 10, for example.

On the upstream side of the cathode gas exhaust flow path 24 than the connection portion with the bypass flow path 26, there is provided a pressure regulating valve 46 that adjusts a pressure of cathode gas on the cathode outlet side of the fuel cell 10. In the bypass flow path 26, there is provided a bypass valve 48 that adjusts a flow rate of cathode gas in the bypass flow path 26. In the embodiment, the bypass flow path 26 is a flow path connecting a portion between the compressor 42 and the supply valve 44 in the cathode gas supply flow path 22 and the downstream side than the pressure regulating valve 46 in the cathode gas exhaust flow path 24.

The anode gas flow path 30 is a flow path for supplying and discharging anode gas to and from the fuel cell 10. The anode gas flow path 30 includes an anode gas supply flow path 32 for supplying anode gas to the fuel cell 10, an anode gas exhaust flow path 34 for discharging anode gas from the fuel cell 10, and an anode gas circulation flow path 36 connecting the anode gas supply flow path 32 and the anode gas exhaust flow path 34.

The anode gas supply flow path 32 is connected to the anode gas tank 60. In the anode gas supply flow path 32, there are provided, in the order from the upstream side, a switching valve 52, a regulator 54, and an injector 56. The switching valve 52 is a valve that controls the presence and absence of inflow of anode gas to the upstream side of the injector 56 from the anode gas tank 60. The regulator 54 is a valve that adjusts a pressure of anode gas on the upstream side of the injector 56. The injector 56 is a valve that controls the inflow of anode gas to the fuel cell 10. In the embodiment, the injector 56 is provided on the upstream side of the anode gas supply flow path 32 than a portion connected to the anode gas circulation flow path 36.

The anode gas exhaust flow path 34 is connected to a gas-liquid separator 58. The anode gas exhaust flow path 34 guides unreacted gas (anode gas, nitrogen gas, etc.) not used for electrochemical reaction in the fuel cell 10 to the gas-liquid separator 58.

The gas-liquid separator 58 separates gas and liquid discharged from the anode of the fuel cell 10. The gas-liquid separator 58 is connected to the anode gas circulation flow path 36 and the exhaust pipe 38. The gas-liquid separator 58 guides unreacted anode gas not used for electrochemical reaction in the fuel cell 10 to the anode gas circulation flow path 36, and liquid including water generated in the fuel cell 10 and nitrogen gas to the exhaust pipe 38.

The exhaust pipe 38 is a pipe for discharging liquid and gas separated by the gas-liquid separator 58 to the outside of the fuel cell system 110. In the exhaust pipe 38, there are provided, in the order from the upstream side, an exhaust valve 57 that discharges gas and drains water and a silencer 59 that reduces noise during such discharge and drain. The exhaust port 75 is provided at a terminal end of the exhaust pipe 38. There are discharged, from the exhaust port 75, water generated in the vehicle 100, nitrogen gas contained in anode exhaust gas, and cathode exhaust gas. In addition, a minute amount of anode gas (hydrogen gas) may be included. That is, the exhaust pipe 38 also discharges exhaust gas including anode gas and cathode gas.

In the embodiment, the cathode gas exhaust flow path 24 is connected to a portion between the exhaust valve 57 and the silencer 59 of the exhaust pipe 38. In this manner, the cathode gas flow path 20 and the compressor 42 and the valves 44, 46, 48 provided in the cathode gas flow path 20 function as a "cathode gas supply unit" that supplies cathode gas to the exhaust pipe 38.

In the anode gas circulation flow path 36, a pump 50 is provided. The pump 50 feeds out gas including anode gas separated by the gas-liquid separator 58 to the anode gas supply flow path 32. The fuel cell system 110 lets anode gas circulate and supplies it again to the fuel cell 10, thus improving the anode gas utilization efficiency.

The control unit 80 is configured as a computer including a central processing unit (CPU), a memory, and an interface circuit to which the above-described parts are connected. In accordance with an order from the ECU 82, the control unit 80 outputs signals for controlling activation and stop of the components in the fuel cell system 110. The ECU 82 is a control unit that controls the whole vehicle 100 including the fuel cell system 110. For example, in the vehicle 100, the ECU 82 performs control of the vehicle 100 in accordance with values of a plurality of driving state parameters such as a stepping amount of an accelerator pedal, a stepping amount of a brake pedal, and a vehicle speed. Note that the ECU 82 may be included in a part of the functions of the control unit 80. The CPU executes control programs stored in the memory to control power generation by the fuel cell system 110 and achieve inundation determination processing described later.

The DC/DC converter 94 increases an output voltage of the fuel cell 10 and supplies it to a PCU 95. The generated power of the fuel cell 10 is supplied to a load such as a drive motor that drives wheels, and the compressor 42, the pump 50, and the various valves described above, through a power circuit including the PCU 95. The PCU 95 restricts a current of the fuel cell 10 by the control of the control unit 80. Note that between the fuel cell 10 and the DC/DC converter 94, there are provided a current measuring unit 91 that measures a current of the fuel cell 10 and a voltage measuring unit 92 that measures a voltage of the fuel cell 10.

Figure 3:
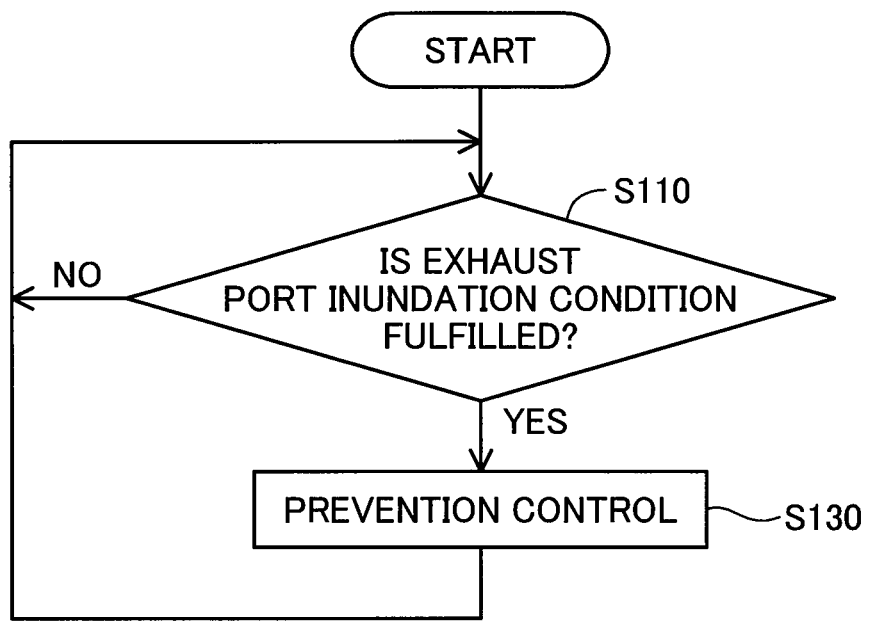
FIG. 3 is a diagram illustrating a flowchart of inundation determination processing performed by a control unit.

FIG. 3 is a diagram illustrating a flowchart of inundation determination processing performed by the control unit 80. The inundation determination processing is constantly performed in a repeated manner during the operation of the vehicle 100.

When the inundation determination processing has started, the control unit 80 first determines whether or not an exhaust port inundation condition is fulfilled. Here, the "exhaust port inundation condition" is a predetermined condition that is supposed to be satisfied in the state where a water surface has reached the exhaust port 75. The exhaust port inundation condition includes the conditions 1, 2, and 3. In the embodiment, the control unit 80 determines that the exhaust port inundation condition is fulfilled if at least one of the conditions 1, 2, and 3 is satisfied. However, the control unit 80 may determine that an exhaust port inundation condition is fulfilled if two or more of the above-described conditions are fulfilled.

<Condition 1>
A flow rate proportion (%) found by dividing a measured flow rate of cathode gas measured by the flowmeter 40 by an assumed flow rate of cathode gas estimated on the basis of an outside air pressure and a rotation speed of the compressor 42, is smaller than a predetermined flow rate proportion threshold.

<Condition 2>
A pressure proportion found by dividing a measured gas pressure measured by the pressure measuring unit 45 by an assumed gas pressure estimated on the basis of an outside air pressure and a rotation speed of the compressor 42, is larger than a predetermined pressure proportion threshold.

<Condition 3>
A voltage proportion (%) found by dividing a measured voltage of the fuel cell 10 measured by the voltage measuring unit 92 by an assumed voltage of the fuel cell 10 estimated on the basis of a measured current of the fuel cell 10 measured by the current measuring unit 91 and a rotation speed of the compressor 42, is smaller than a predetermined voltage proportion threshold.

Figure 4:
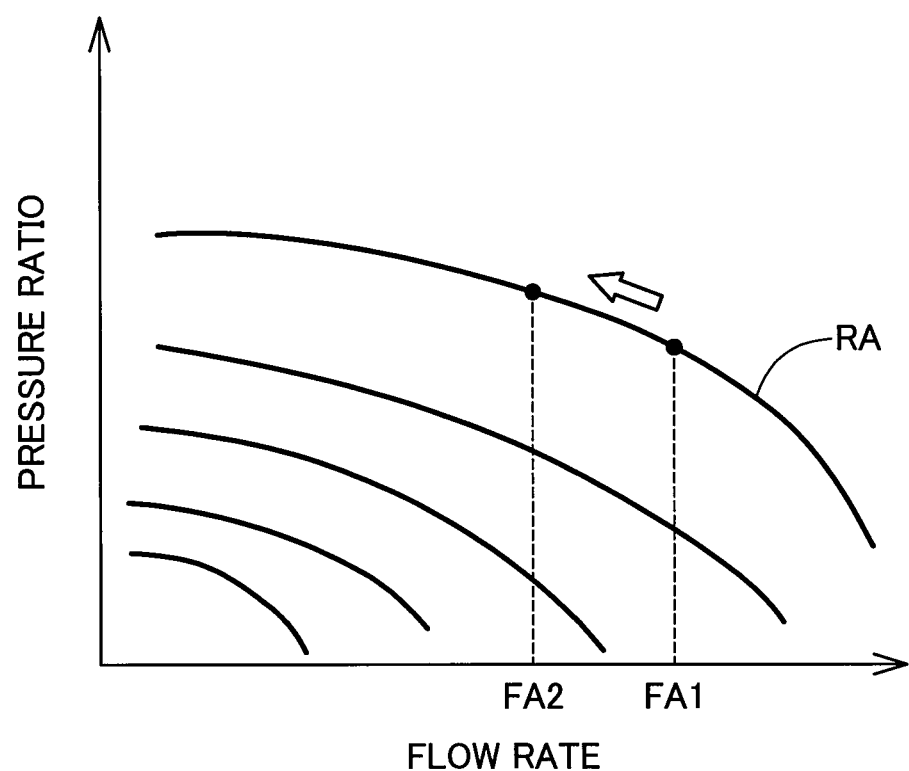
FIG. 4 is a diagram illustrating the relation between a pressure ratio and a flow rate of cathode gas [NL/minute], in relation to the above-described conditions.

FIG. 4 is a diagram illustrating the relation between a pressure ratio and a flow rate of cathode gas [NL/minute] in relation to the above-described conditions 1 and 2. The pressure ratio is a value found by dividing an outlet pressure of the compressor 42 by an inlet pressure thereof. The inlet pressure may be considered to be equal to an outside air pressure. Each of a plurality of curved lines in FIG. 4 is a line showing the relation between a pressure ratio and a flow rate at the same rotation speed of the compressor 42. In the embodiment, a turbo compressor is used as the compressor 42. Thus, even if cathode gas is fed to the fuel cell 10 at the same rotation speed, the flow rate of cathode gas considerably differs depending on a pressure ratio.

It is supposed that FA1 is a flow rate of cathode gas in a case where the rotation speed of the compressor 42 is a rotation speed on a curved line RA and a water surface has not reached the exhaust port 75. In such a case, when a water surface has reached the exhaust port 75, cathode gas discharged from the exhaust port 75 is reduced, which increases a pressure in the fuel cell 10 and increases a pressure ratio illustrated in FIG. 4. As a result, even with the same outside air pressure and rotation speed of the compressor 42, the flow rate of cathode gas becomes FA2 smaller than FA1.

Figure 5:
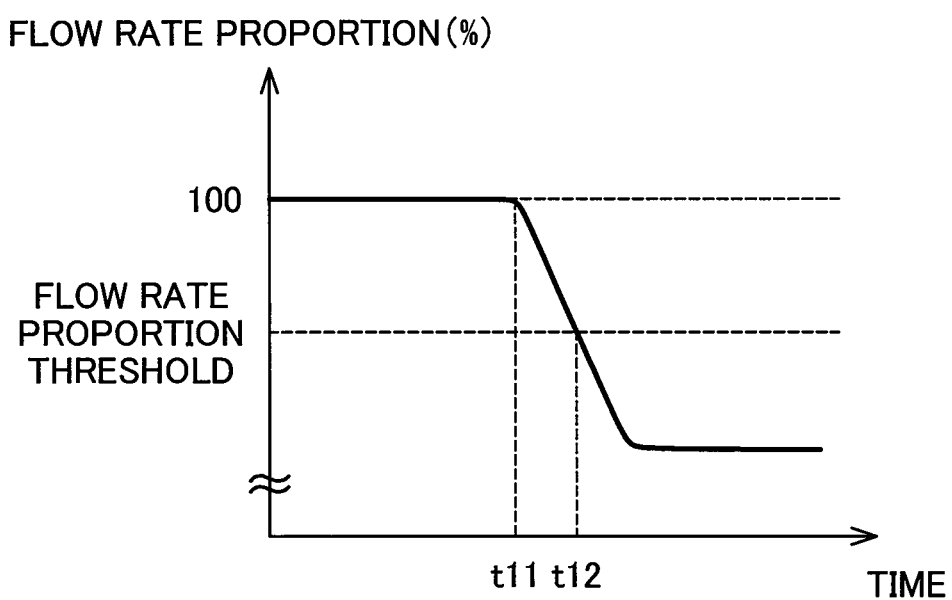
FIG. 5 is a diagram for describing the condition 1.

FIG. 5 is a diagram for describing the condition 1. In FIG. 5, the vertical axis represents a flow rate proportion (%) of the condition 1, and the horizontal axis represents time. Generally, cathode gas having reached the exhaust port 75 is normally discharged from the exhaust port 75. Thus, the flow rate of cathode gas measured by the flowmeter 40 is substantially equal to an assumed flow rate of cathode gas estimated on the basis of a rotation speed of the compressor 42, and the flow rate proportion is substantially 100%. However, when a water surface has reached the exhaust port 75, the flow rate of cathode gas measured by the flowmeter 40 is reduced relative to the assumed flow rate of cathode gas estimated on the basis of an outside air pressure and a rotation speed of the compressor 42, and a flow rate proportion is also reduced. In FIG. 5, the flow rate proportion starts to be reduced from time t11, and becomes smaller than a predetermined flow rate proportion threshold at time t12. Thus, the condition 1 is fulfilled.

Here, the flow rate proportion threshold of the condition 1 in the embodiment is set to 85%. This flow rate proportion threshold may be defined experimentally. Note that the flow rate proportion threshold of the condition 1 is not limited thereto, and may be 90%, 80% or 75%, for example. Note that in the embodiment, a map showing the relation between a pressure ratio and a flow rate of cathode gas is stored in the control unit 80, and the control unit 80 determines an assumed flow rate using the map. However, the embodiment is not limited thereto, and the control unit 80 may calculate an assumed flow rate on the basis of a pressure ratio and a rotation speed of the compressor 42. Moreover, a rotation torque of the compressor 42 may be used instead of a rotation speed of the compressor 42.

The condition 2 uses the same principle as the above-described condition 1. That is, the condition 2 also uses the principle in which when a water surface has reached the exhaust port 75, cathode gas having reached the exhaust port 75 is not normally discharged from the exhaust port 75, thereby increasing a pressure in the fuel cell 10. On the basis of this principle, if a value found by dividing a measured gas pressure measured by the pressure measuring unit 45 by an assumed gas pressure estimated on the basis of an outside air pressure and a rotation speed of the compressor 42 is larger than a predetermined pressure proportion threshold (e.g., 120%), the condition 2 is fulfilled.

The pressure proportion threshold of the condition 2 is not limited thereto, and may be 115%, 110%, or 105%, for example. Note that in the embodiment, a map showing the relation between a pressure ratio and a flow rate of cathode gas is stored in the control unit 80, and the control unit 80 determines an assumed gas pressure using the map. However, the embodiment is not limited thereto, and the control unit 80 may calculate an assumed gas pressure on the basis of a pressure ratio and a rotation speed of the compressor 42.

Figure 6:
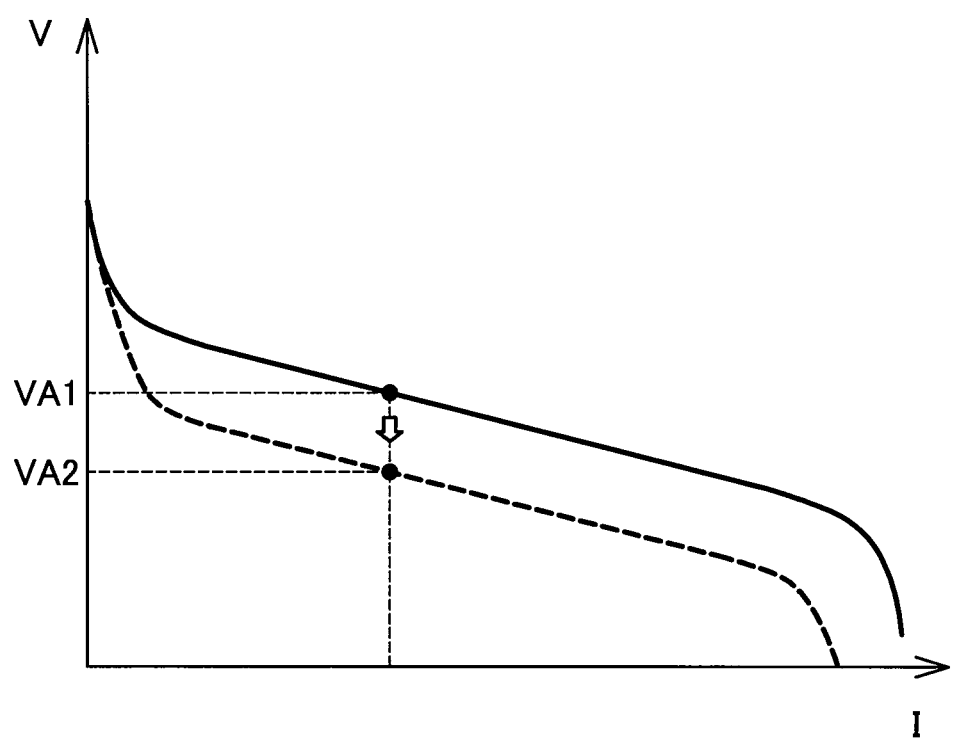
FIG. 6 is a diagram illustrating the relation between a voltage and a current of a fuel cell, in relation to the above-described condition 3.

FIG. 6 is a diagram illustrating the relation between a voltage and a current of the fuel cell 10, in relation to the above-described condition 3. The solid line shows a case where a water surface has not reached the exhaust port 75, and the broken line shows a case where a water surface has reached the exhaust port 75. If a water surface has reached the exhaust port 75, a pressure of the outlet of the fuel cell 10 is increased and cathode gas supplied to the fuel cell 10 is reduced. Thus, as compared with a case where a water surface has not reached the exhaust port 75, a voltage value relative to the same current value tends to be reduced.

It is supposed that VA1 is a voltage of the fuel cell 10 in a case where a water surface has not reached the exhaust port 75. In this case, when a water surface has reached the exhaust port 75, cathode gas in the fuel cell 10 is not normally discharged even with the same current value. Thus, the voltage of the fuel cell 10 becomes VA2 smaller than VA1.

Figure 7:
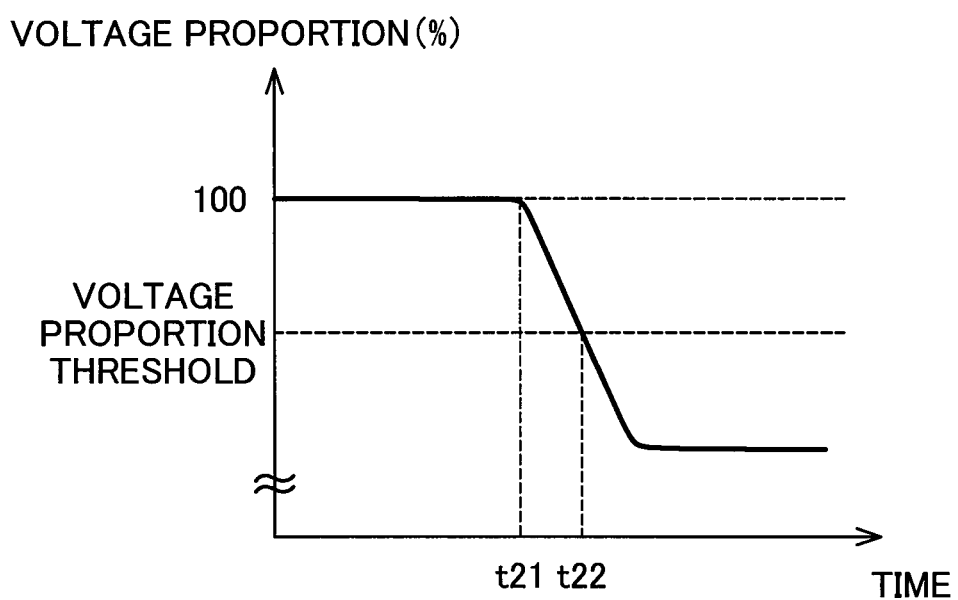
FIG. 7 is a diagram for describing the condition 3.

FIG. 7 is a diagram for describing the condition 3. In FIG. 7, the vertical axis represents a voltage proportion (%), and the horizontal axis represents time. Generally, cathode gas having reached the exhaust port 75 is normally discharged from the exhaust port 75. Thus, the measured voltage of the fuel cell 10 is substantially equal to an assumed voltage of the fuel cell 10 estimated on the basis of a measured current of the fuel cell 10 and a rotation speed of the compressor 42, and the voltage proportion is substantially 100%. However, when a water surface has reached the exhaust port 75, a measured voltage of the fuel cell 10 is reduced relative to an assumed voltage of the fuel cell 10 estimated on the basis of a measured current of the fuel cell 10 and a rotation speed of the compressor 42, and the voltage proportion is also reduced. In FIG. 7, the voltage proportion starts to be reduced from time t21, and becomes smaller than a predetermined voltage proportion threshold at time t22. Thus, the condition 3 is fulfilled.

Here, the voltage proportion threshold in the condition 3 is 85%, for example. The voltage proportion threshold may be defined experimentally. Note that the voltage proportion threshold of the condition 3 is not limited thereto, and may be 90%, 80% or 75%, for example. Note that in the embodiment, a map showing the relation between a voltage and a current of the fuel cell 10 in accordance with a rotation speed of the compressor 42 is stored in the control unit 80, and the control unit 80 determines an assumed voltage using the map. However, the embodiment is not limited thereto, and the control unit 80 may calculate an assumed voltage on the basis of a rotation speed of the compressor 42 and a measured current of the fuel cell 10. Moreover, in the embodiment, the voltage of the fuel cell 10 is used in the condition 3. However, instead of the voltage of the fuel cell 10, there may be used a generated power of the fuel cell 10 that is a product of a voltage and a current of the fuel cell 10. From the viewpoint of accuracy, it may be preferable to use generated power in some instances.

As illustrated in FIG. 3, when the control unit 80 has determined that the exhaust port inundation condition is not fulfilled (No at Step S110), the flow returns to Step S110. Meanwhile, when the control unit 80 has determined that the exhaust port inundation condition is fulfilled (Yes at Step S110), the control unit 80 performs prevention control (Step S130). The "prevention control" is a control for preventing the anode gas detector 70 from erroneously detecting anode gas discharged from the exhaust port 75 as leakage of anode gas from the anode gas flow path 30.

In the embodiment, the control unit 80 performs gas amount increase control as prevention control. Here, the "gas amount increase control" is a control for increasing a supply flow rate of cathode gas to the exhaust pipe 38, as compared with a case where the prevention control is not performed. In the embodiment, the rotation speed of the compressor 42 as a cathode gas supply unit is increased to increase a supply amount of cathode gas to the exhaust pipe 38. In the embodiment, the prevention control is performed for one minute. However, the embodiment is not limited thereto, and the prevention control may be performed until the exhaust port inundation condition is not fulfilled any more or until a flow rate proportion, a voltage proportion, or a pressure proportion is improved (e.g., until such a proportion becomes 100%), for example. After the prevention control is performed, the flow returns to Step S110. The control unit 80 repeats the above-described sequence of processing until the operation of the vehicle 100 is finished.

Figure 8:
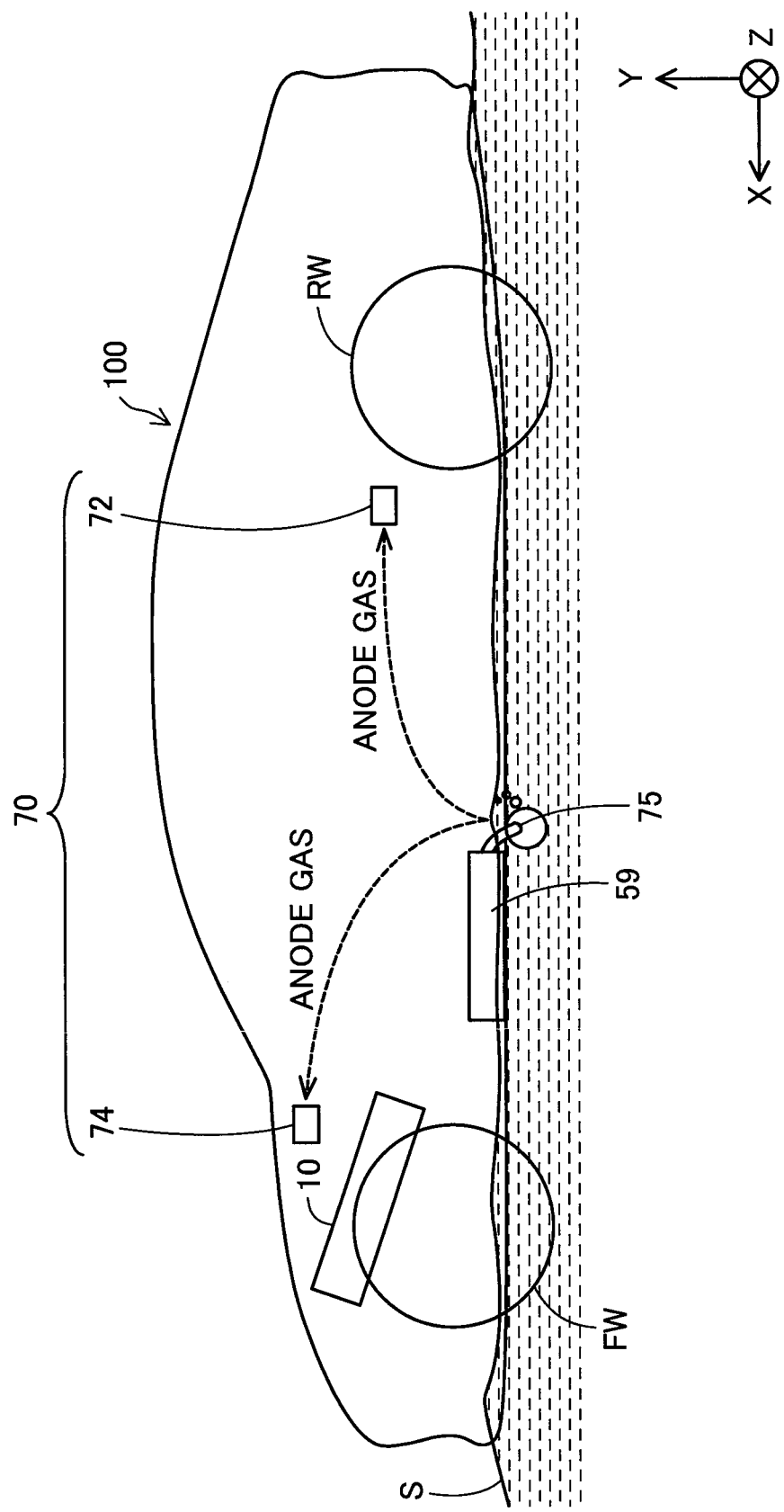
FIG. 8 is a diagram illustrating the state in which a water surface has reached an exhaust port.

FIG. 8 is a diagram illustrating the state in which a water surface S has reached the exhaust port 75. Generally, gas discharged from the exhaust port 75 is diffused to the atmosphere. Meanwhile, if the water surface S has reached the exhaust port 75, the water prevents diffusion of gas discharged from the exhaust port 75, which may allow the discharged gas to enter the inside of the vehicle 100 through a gap between the exhaust port 75 and the undercover 77 of the vehicle 100 and other gaps. As a result, the anode gas detector 70 provided in the vehicle 100 may erroneously detect anode gas contained in the discharged gas as leakage of anode gas from the anode gas flow path 30. Consequently, the ECU 82 may request the control unit 80 to stop the operation of the fuel cell system 110.

However, in the embodiment, the prevention control is performed if the above-described exhaust port inundation condition is fulfilled. Thus, it is possible to prevent the anode gas detector 70 from erroneously detecting leakage of anode gas from the anode gas flow path 30. In the embodiment, the gas amount increase control for increasing a supply amount of cathode gas to the exhaust port 75 is performed as the prevention control. As a result, the amount of anode gas relative to the entire amount of gas discharged from the exhaust port 75 is diluted relatively, which prevents detection by the anode gas detector 70 even if the discharged gas enters the inside of the vehicle 100. Especially, in the embodiment, the exhaust port 75 is provided between the first anode gas detector 72 and the second anode gas detector 74 in the travelling direction (+X-axis direction) of the vehicle 100. Thus, gas having entered the inside of the vehicle 100 may reach the first anode gas detector 72 and the second anode gas detector 74. However, in the embodiment, the prevention control effectively prevents the anode gas detector 70 from erroneously detecting leakage of anode gas. Note that the embodiment exerts the same effects not only in a case where a water surface has reached the exhaust port 75 but also in a case where snow on a road has reached the exhaust port 75.

B. Second Embodiment

Figure 9:
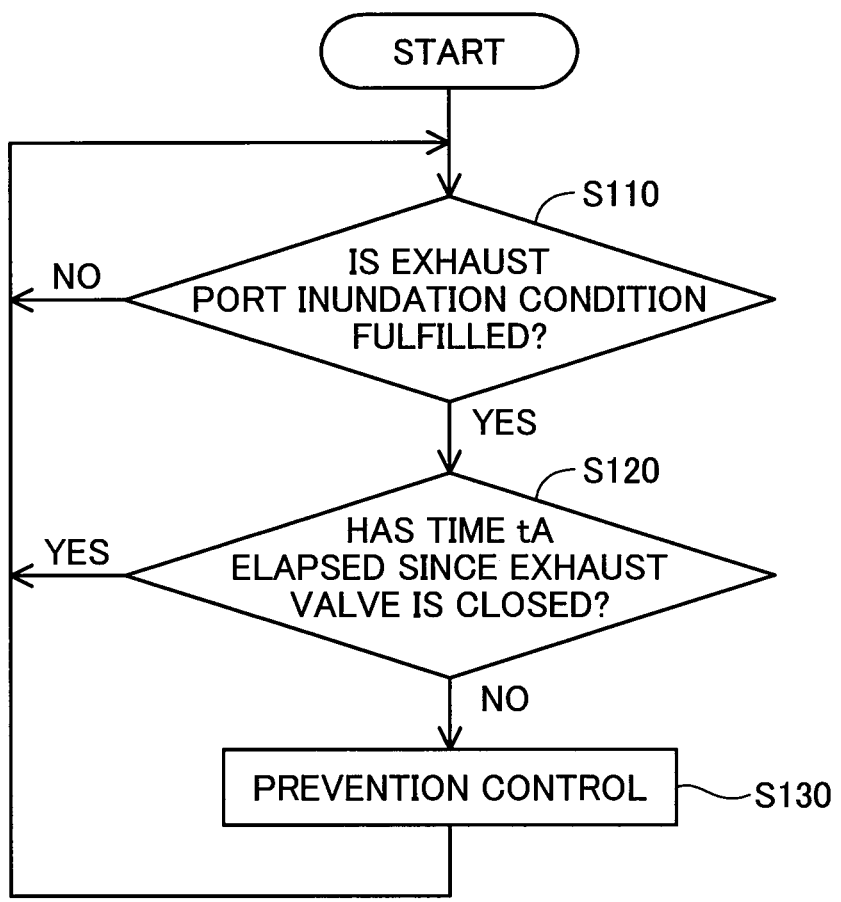
FIG. 9 is a diagram illustrating a flowchart of inundation determination processing according to a second embodiment.

FIG. 9 is a diagram illustrating a flowchart of inundation determination processing according to the second embodiment. The second embodiment is different from the first embodiment in the aspect that Step S120 is arranged between Step S110 and Step S130, and is same as the first embodiment in the other aspects.

In the second embodiment, when the control unit 80 has determined that the exhaust port inundation condition is fulfilled (Yes at Step S110), the control unit 80 determines whether or not the predetermined time tA or longer has elapsed since the exhaust valve 57 is closed (Step S120). In the embodiment, the time tA is five seconds. However, the embodiment is not limited thereto, and it may be three seconds or ten seconds, for example.

When the control unit 80 has determined that the predetermined time tA or longer has not elapsed since the exhaust valve 57 is closed (No at Step S120), the control unit 80 performs prevention control (Step S130). Meanwhile, when the control unit 80 has determined that the predetermined time tA or longer has elapsed since the exhaust valve 57 is closed (Yes at Step S120), the flow returns to Step S110. That is, in the second embodiment, when the control unit 80 has determined that the predetermined time tA or longer has elapsed since the exhaust valve 57 is closed, the control unit 80 does not perform prevention control.

In this manner, in the second embodiment, the prevention control is not performed in a case where the fulfillment of the exhaust port inundation condition is not supposedly due to the opening of the exhaust valve 57. That is, the prevention control is not performed in the situation supposing that the leakage of anode gas from the anode gas flow path 30 and the like actually occurs. Therefore, in the second embodiment, it is possible to securely detect leakage of anode gas from the anode gas flow path 30 and the like. Note that in the embodiment, Step S120 is performed between Step S110 and Step S130. However, the embodiment is not limited thereto, and Step S120 may be performed before Step S110.

C. Third Embodiment

The third embodiment is different from the first embodiment in the method of cathode gas flow rate increase control, and is same as the first embodiment in the other aspects. In the third embodiment, the control unit 80 performs bypass flow rate increase control as the cathode gas flow rate increase control. Here, the "bypass flow rate increase control" is a control for increasing a flow rate of cathode gas in the bypass flow path 26, as compared with a case where the prevention control is not performed.

To be more specific, as the bypass flow rate increase control, the control unit 80 controls at least one of the compressor 42, the supply valve 44, the pressure regulating valve 46, and the bypass valve 48 to increase a flow rate of cathode gas in the bypass flow path 26, as compared with a case where the exhaust port inundation condition is not fulfilled. In the embodiment, the control unit 80 opens the bypass valve 48 while the compressor 42 is operated to increase a flow rate of cathode gas in the bypass flow path 26. However, the embodiment is not limited thereto. For example, the control unit 80 may control the supply valve 44 and the bypass valve 48 and increases an amount of cathode gas passing the bypass flow path 26 to increase a supply amount of cathode gas to the exhaust port 75.

In a case where cathode gas passes the bypass flow path 26, a pressure loss is smaller than a case where cathode gas passes the fuel cell 10. Thus, in the third embodiment, a flow rate of cathode gas passing the bypass flow path 26 and reaching the exhaust port 75 is increased, which makes it possible to reduce a load of the compressor 42, prevent drying of the fuel cell 10, and improve the fuel efficiency, as compared with a case where a flow rate of cathode gas passing the fuel cell 10 and reaching the exhaust port 75 is increased.

D. Fourth Embodiment

Figure 10:
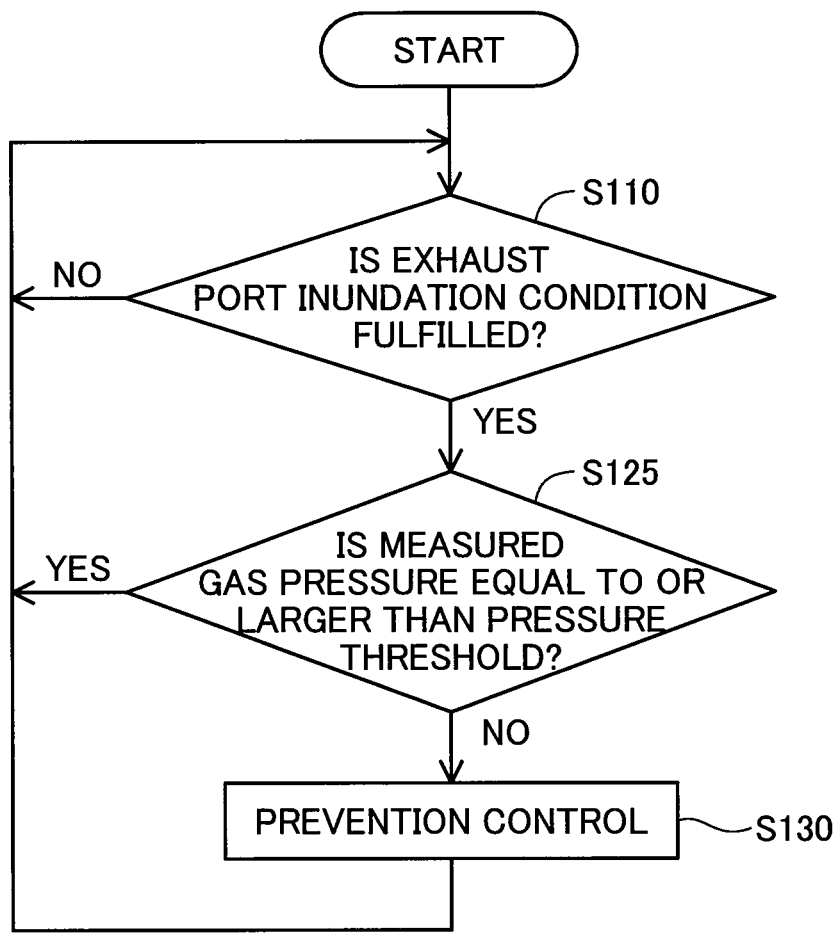
FIG. 10 is a diagram illustrating a flowchart of inundation determination processing according to a fourth embodiment.

FIG. 10 is a diagram illustrating a flowchart of inundation determination processing according to the fourth embodiment. The fourth embodiment is different from the first embodiment in the aspect that Step S125 is arranged between Step S110 and Step S130, and is same as the first embodiment in the other aspects.

In the fourth embodiment, when the control unit 80 has determined that the exhaust port inundation condition is fulfilled (Yes at Step S110), the control unit 80 determines whether or not a measured gas pressure measured by the pressure measuring unit 45 is equal to or larger than a predetermined pressure threshold (Step S125). In the embodiment, the above-described pressure threshold is a pressure at which a flow rate of cathode gas at the cathode gas inlet of the fuel cell 10 is 1000 NL/minute. However, the embodiment is not limited thereto, and the above-described pressure threshold may be a pressure at which a flow rate of cathode gas at the cathode gas inlet of the fuel cell 10 is 700 NL/minute or 1500 NL/minute, for example.

When the control unit 80 has determined that the measured gas pressure is not equal to or larger than the predetermined pressure threshold (No at Step S125), the control unit 80 performs prevention control (Step S130). Meanwhile, when the control unit 80 has determined that the measured gas pressure is equal to or larger than the predetermined pressure threshold (Yes at Step S125), it is considered that the anode gas discharged from the exhaust port 75 is sufficiently diluted by cathode gas discharged from the fuel cell 10. Thus, the flow returns to Step S110.

In this manner, in the fourth embodiment, unnecessary prevention control does not need to be performed. Note that in the embodiment, Step S125 is performed between Step S110 and Step S130. However, the embodiment is not limited thereto, and Step S125 may be performed before Step S110.

E. Fifth Embodiment

The fifth embodiment is different from the first embodiment in the aspect that easing control is performed as the prevention control, and is same as the first embodiment in the other aspects. The "easing control" is a control for easing a detection criterion for the anode gas detector 70 to detect leakage of anode gas within a regulation range. Here, the detection criterion of the embodiment is satisfied when an average concentration of anode gas in a detection period (e.g., two seconds) exceeds an average concentration threshold (e.g., 3%), so that the anode gas detector 70 detects leakage of anode gas. The regulation range is a range in which an anode gas average concentration in an arbitrary three seconds is smaller than 4%.

Figure 11:
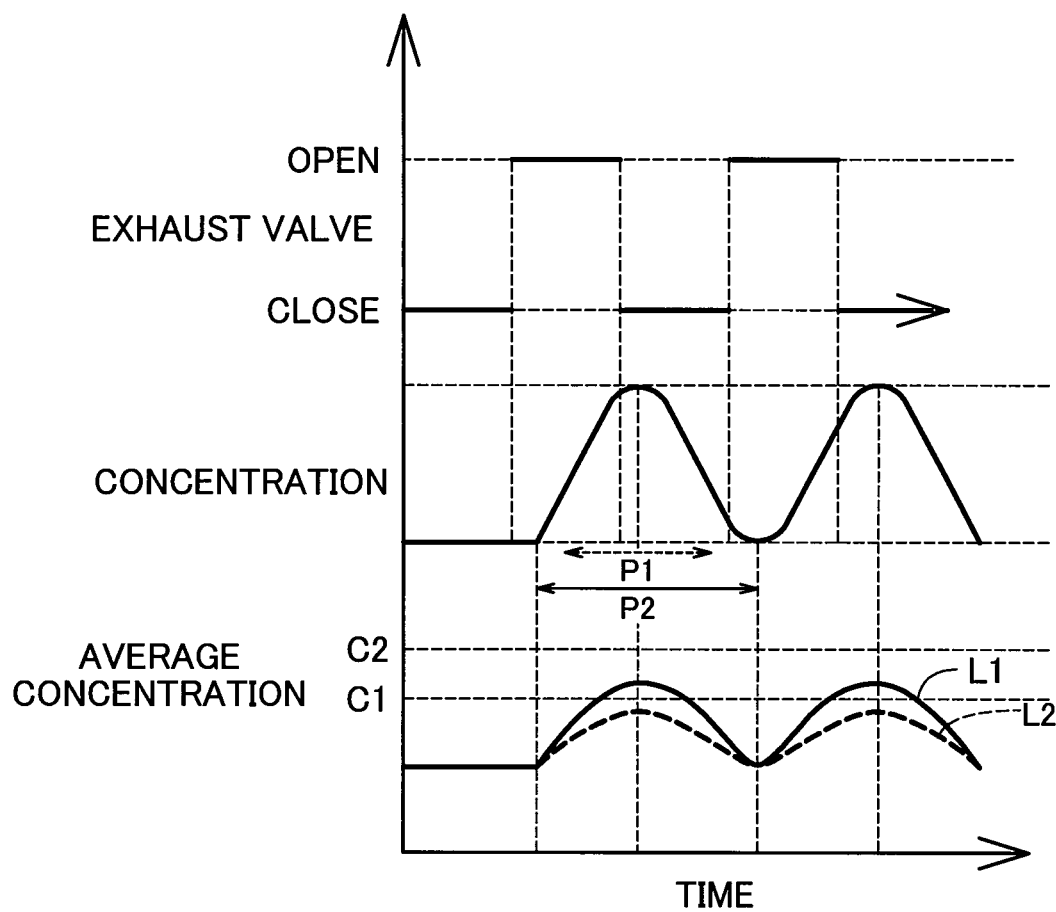
FIG. 11 is a diagram illustrating the transition of concentration of anode gas in a case where gas discharged from the exhaust port has entered the inside of the vehicle.

FIG. 11 is a diagram illustrating the transition of concentration of anode gas in a case where gas discharged from the exhaust port 75 enters the inside of the vehicle 100. In FIG. 11, the horizontal axis represents time, and the vertical axis represents, from the upper side, opening and closing of the exhaust valve 57, the concentration of anode gas, and the average concentration of anode gas. As illustrated in FIG. 11, if gas discharged from the exhaust port 75 has entered the inside of the vehicle 100, the concentration of anode gas measured by the anode gas detector 70 increases when the exhaust valve 57 is opened and reduces when the exhaust valve 57 is closed. Moreover, similarly to the increase and decrease of anode gas concentration, the average concentration in a detection period also increases and decreases. The solid line L1 illustrated in FIG. 11 shows an average concentration L1 in a detection period.

In the embodiment, the average concentration threshold is set to a first concentration C1 (e.g., 3%) in a case where the exhaust port inundation condition is not fulfilled, and to a second concentration C2 (e.g., 4%) in a case where the exhaust port inundation condition is fulfilled. In the embodiment, the detection criterion is eased within a regulation range in such a manner, which makes it possible to prevent the anode gas detector 70 from erroneously detecting leakage of anode gas even if gas discharged from the exhaust port 75 has entered the inside of the vehicle 100.

The easing control is not limited thereto, and the detection period may be eased. To be more specific, the detection period may be set to a first period P1 (e.g., two seconds) in a case where the exhaust port inundation condition is not fulfilled, and to a second period P2 (e.g., three seconds) longer than the first period P1 in a case where the exhaust port inundation condition is fulfilled. In FIG. 11, the solid line L1 shows an average concentration in the first period P1, and the broken line L2 shows an average concentration in the second period P2. In such a manner, a peak of the average concentration becomes lower. Thus, even if gas discharged from the exhaust port 75 has entered the inside of the vehicle 100, it is possible to prevent the anode gas detector 70 from detecting it as leakage of anode gas. Note that easing by the detection period may be used with easing by the average concentration threshold.

F. Sixth Embodiment

The sixth embodiment is different from the first embodiment in the aspect that the prevention control is not performed in a case of predetermined condition, and is same as the first embodiment in the other aspects. To be more specific, in the sixth embodiment, if an increase width of concentration of anode gas detected by the anode gas detector 70 is equal to or larger than a predetermined allowed range, the control unit 80 does not perform prevention control.

Figure 12:
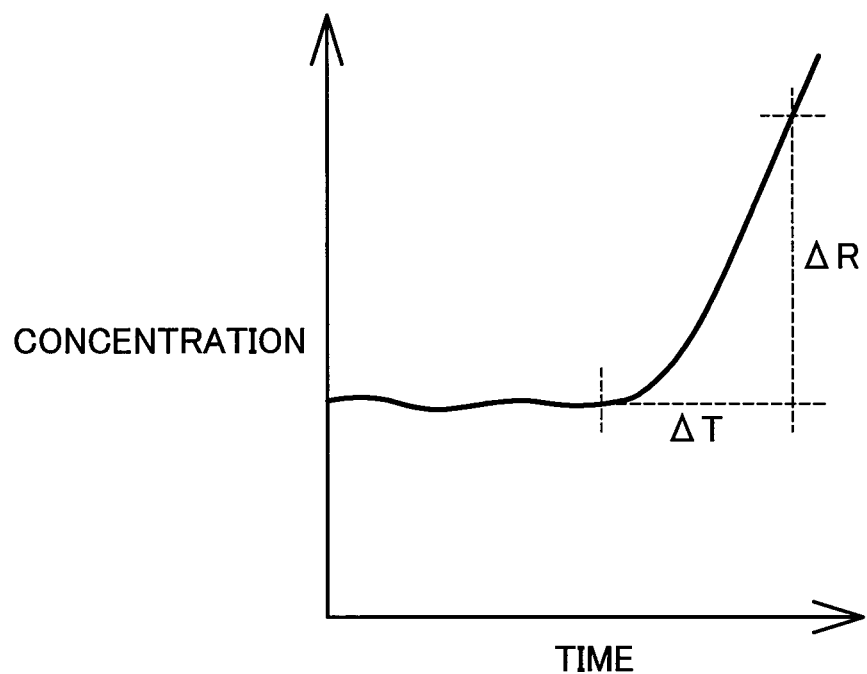
FIG. 12 is a diagram illustrating the transition of concentration of anode gas in a case where the leakage of anode gas occurs.

FIG. 12 is a diagram illustrating the transition of concentration of anode gas in a case where leakage of anode gas occurs. The vertical axis represents concentration of anode gas, and the horizontal axis represents time. As illustrated in FIG. 12, when anode gas leaks from the anode gas tank 60 or the fuel cell 10, the anode gas concentration continues to increase.

In the embodiment, if an increase width $\Delta R$ of anode gas concentration in a predetermined period $\Delta T$ (e.g., ten seconds) is equal to or larger than a predetermined allowed range, the control unit 80 does not perform prevention control. The allowed range may be set to 3%, for example. In this manner, in the embodiment, the prevention control is not performed in a situation supposing that the leakage of anode gas from the anode gas flow path 30 and the like actually occurs. Therefore, it is possible to securely detect leakage of anode gas from the anode gas flow path 30 and the like.

G. Other Embodiments (1) In the above-described first embodiment, the control unit 80 performs prevention control when the flow rate proportion (%) is determined to be equal to or smaller than a flow rate proportion threshold. However, the embodiment is not limited thereto. For example, the control unit 80 may not perform prevention control when the flow rate proportion (%) is determined to be equal to or smaller than a lower limit threshold that is smaller than a flow rate proportion threshold.

Figure 13:
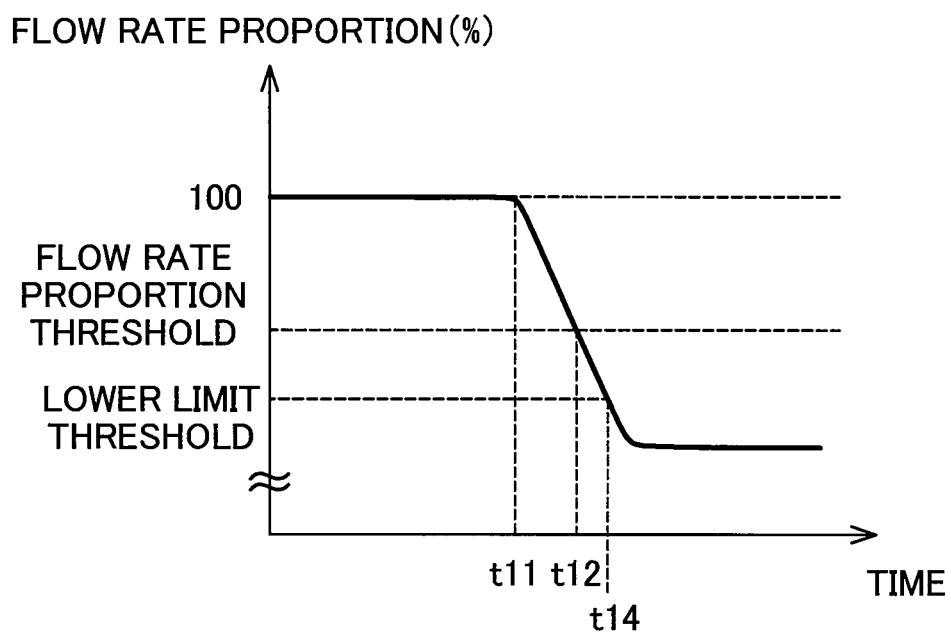
FIG. 13 is a diagram for describing a lower limit threshold.

FIG. 13 is a diagram for describing a lower limit threshold. As illustrated in FIG. 13, if the flow rate proportion becomes equal to or smaller than a lower limit threshold (e.g., 70%) (after time t14), it is assumed that a pressure loss is high not because inundation to the exhaust port 75 occurs but because the pipe in which cathode gas flows is blocked partially. Therefore, in this manner, unnecessary control does not need to be performed.

(2) In the fuel cell system of the above-described form, the prevention control may include gas amount increase control for increasing a supply flow rate of the cathode gas to the exhaust pipe, as compared with a case where the prevention control is not performed. In the fuel cell system of this form, the prevention control sufficiently dilutes an anode gas amount in gas discharged from the exhaust port. As a result, it is possible to prevent the anode gas detector from erroneously detecting leakage of anode gas.

(3) The fuel cell system of the above-described form includes a cathode gas supply unit that includes the compressor and the cathode gas supply flow path and supplies the cathode gas to the exhaust pipe, the cathode gas supply unit further including a cathode gas exhaust flow path that discharges the cathode gas from the fuel cell and is connected to the exhaust pipe, a bypass flow path that connects the cathode gas supply flow path and the cathode gas exhaust flow path, a supply valve that is provided on the downstream side of the cathode gas supply flow path than a connection portion with the bypass flow path, a pressure regulating valve that is provided on the upstream side of the cathode gas exhaust flow path than a connection portion with the bypass flow path, and a bypass valve that is provided in the bypass flow path, in which the control unit may control the cathode gas supply unit and perform, as the prevention control, bypass flow rate increase control for increasing a flow rate of the cathode gas in the bypass flow path, as compared with a case where the prevention control is not performed. In the fuel cell system of this form, a flow rate of cathode gas passing the bypass flow path and reaching the exhaust port is increased, which makes it possible to reduce a load of the compressor, prevent drying of the fuel cell, and improve the fuel efficiency, as compared with a case where a flow rate of cathode gas passing the fuel cell and reaching the exhaust port is increased.

(4) In the fuel cell system of the above-described form, the control unit may not perform the bypass flow rate increase control if the measured gas pressure is equal to or larger than a predetermined pressure threshold. The fuel cell system of this form improves the fuel efficiency.

(5) The fuel cell system of the above-described form further includes an exhaust valve provided in the exhaust pipe, in which the control unit may not perform the prevention control if elapsed time since the exhaust valve is closed is equal to or longer than predetermined time, even if the given condition is satisfied. In the fuel cell system of this form, unnecessary control does not need to be performed.

(6) In the fuel cell system of the above-described form, the prevention control may include easing control for easing a detection criterion for the anode gas detector to detect leakage of anode gas within a regulation range, as compared with a case where the prevention control is not performed.

In the fuel cell system of this form, the easing control is performed in a situation supposing that a water surface has reached an exhaust port, which prevents erroneous detection of anode gas discharged from the exhaust port as leakage of anode gas from an anode gas flow path.

(7) In the fuel cell system of the above-described form, the control unit may not perform the prevention control if an increase width of concentration of the anode gas detected by the anode gas detector is equal to or larger than a predetermined allowed range. In the fuel cell system of the above-described form, the prevention control is not performed in a situation supposing that the leakage of anode gas actually occurs. Therefore, it is possible to securely detect leakage of anode gas.

The present disclosure is not limited to the above-described embodiments, and may be achieved by various configurations without departing from the scope of the disclosure. For example, the technical features in the embodiments corresponding to the technical features of each form in SUMMARY may be appropriately replaced or combined in order to solve a part or all of the above-described problems or achieve a part or all of the above-described effects. Moreover, unless the technical features are explained as necessary in the specification, they may be deleted appropriately.

What is claimed is:

1. A fuel cell system, comprising:
a fuel cell that generates power by electrochemical reaction between anode gas and cathode gas;
an exhaust pipe that has an exhaust port for discharging exhaust gas including the cathode gas and the anode gas discharged from the fuel cell;
a cathode gas supply flow path that supplies the cathode gas to the fuel cell;
a compressor that is provided in the cathode gas supply flow path to feed the cathode gas to the fuel cell;
an anode gas detector that is provided outside a flow path of the anode gas to detect the anode gas; and
a control unit configured to perform, when an exhaust port inundation condition is satisfied, prevention control for preventing the anode gas detector from detecting the anode gas as leakage of the anode gas, the prevention control includes a gas amount increase control for increasing a supply flow rate of the cathode gas to the exhaust pipe, as compared with a case without the prevention control, wherein
the control unit is configured to determine the exhaust port inundation condition is satisfied when at least one of
(i) a flow rate proportion, found by dividing a measured flow rate that is a flow rate of cathode gas introduced by the compressor by an assumed flow rate of the cathode gas estimated on a basis of an outside air pressure and a rotation speed of the compressor, is smaller than a predetermined flow rate proportion threshold,
(ii) a pressure proportion, found by dividing a measured gas pressure that is a pressure at a cathode gas inlet or cathode gas outlet of the fuel cell by an assumed gas pressure estimated on the basis of the outside air pressure and the rotation speed of the compressor, is larger than a predetermined pressure proportion threshold, and
(iii) a voltage proportion, found by dividing a measured voltage that is an outlet voltage of the fuel cell by an assumed voltage of the fuel cell estimated on the basis of a measured current that is an output current of the fuel cell and the rotation speed of the compressor, is smaller than a predetermined voltage proportion threshold, is satisfied.

2. The fuel cell system according to claim 1, further comprising:
   a cathode gas supply unit that includes the compressor and the cathode gas supply flow path and supplies the cathode gas to the exhaust pipe, the cathode gas supply unit further including
   a cathode gas exhaust flow path that discharges the cathode gas from the fuel cell and is connected to the exhaust pipe,
   a bypass flow path that connects the cathode gas supply flow path and the cathode gas exhaust flow path,
   a supply valve that is provided on a downstream side of the cathode gas supply flow path than a connection portion with the bypass flow path,
   a pressure regulating valve that is provided on an upstream side of the cathode gas exhaust flow path than a connection portion with the bypass flow path, and
   a bypass valve that is provided in the bypass flow path, wherein
   the control unit is configured to control the cathode gas supply unit and perform, as the prevention control, bypass flow rate increase control for increasing a flow rate of the cathode gas in the bypass flow path, as compared with the case without the prevention control.

3. The fuel cell system according to claim 2, wherein the control unit does not perform the bypass flow rate increase control with the measured gas pressure being equal to or larger than a predetermined pressure threshold.

4. The fuel cell system according to claim 1, further comprising:
   an exhaust valve provided in the exhaust pipe, wherein
   the control unit does not perform the prevention control with elapsed time since the exhaust valve is closed being equal to or longer than predetermined time, even if the exhaust port inundation condition is satisfied.

5. The fuel cell system according to claim 1, wherein the control unit is configured to perform the prevention control that includes easing control for easing a detection criterion for the anode gas detector to detect leakage of anode gas within a regulation range, as compared with a case without the prevention control.

6. The fuel cell system according to claim 1, wherein the control unit does not perform the prevention control with an increase width of concentration of the anode gas detected by the anode gas detector being equal to or larger than a predetermined allowed range.

* * * * *